United States Patent
Nishihara (10) Patent No.: US 12,182,645 B2
(45) Date of Patent: Dec. 31, 2024

(54) IMAGE FORMING APPARATUS CAPABLE OF SETTING PRINT START POSITION FOR BACK SIDE OF RECORDING PAPER SHEET BASED ON MARGIN FORMED BY REDUCING IMAGE FOR BACK SIDE IN SIZE

(71) Applicant: KYOCERA Document Solutions Inc., Osaka (JP)

(72) Inventor: Masaaki Nishihara, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/387,446

(22) Filed: Nov. 6, 2023

(65) Prior Publication Data

US 2024/0160876 A1     May 16, 2024

(30) Foreign Application Priority Data

Nov. 14, 2022   (JP) ................................. 2022-182037

(51) Int. Cl.
    *G06F 15/00*     (2006.01)
    *G06K 15/02*     (2006.01)

(52) U.S. Cl.
    CPC ................. *G06K 15/1843* (2013.01)

(58) Field of Classification Search
    None
    See application file for complete search history.

(56) References Cited

U.S. PATENT DOCUMENTS

2006/0066647 A1*   3/2006   Koga ................... B41J 11/0065
                                                                                      347/5

FOREIGN PATENT DOCUMENTS

JP         6326805 B2     5/2018

* cited by examiner

*Primary Examiner* — Mark R Milia
(74) *Attorney, Agent, or Firm* — IP Business Solutions, LLC.

(57) ABSTRACT

An image forming apparatus includes an image forming device, a controller, and an image processor that creates a reduced-size image from an original-size image of back-side image data at a size reduction ratio according to a magnification ratio from a first shrunk state of a recording paper sheet with only a front-side image formed to a second shrunk state after formation of the front-side and back-side images so that the back-side and front-side images on the sheet match respective original sizes of front-side image data and back-side image data. The controller allows the image forming device to form the front-side image, sets, based on a margin formed by the size reduction, a print start position for a back side of the sheet where the front-side and back-side images on the sheet are locationally aligned, and then allows the image forming device to form the reduced-size image as the back-side image.

2 Claims, 11 Drawing Sheets

IMAGE FORMING APPARATUS CAPABLE OF SETTING PRINT START POSITION FOR BACK SIDE OF RECORDING PAPER SHEET BASED ON MARGIN FORMED BY REDUCING IMAGE FOR BACK SIDE IN SIZE

This application claims priority to Japanese Patent Application No. 2022-182037 filed on Nov. 14, 2022, the entire contents of which are incorporated by reference herein.

BACKGROUND

The present disclosure relates to image forming apparatuses capable of duplexing.

When an image forming apparatus capable of duplexing performs duplexing, a front-side image formed on the front side of a recording paper sheet may not be matched in size with a back-side image formed on the back side thereof, which deteriorates the finish quality of a printed matter.

For example, a general ink-jet image forming apparatus forms an image on the front side of a recording paper sheet by applying ink to the front side, allows the applied ink to dry, and then forms an image on the back side of the recording paper sheet by applying ink to the back side thereof. In doing so, the recording paper sheet shrinks in the process of drying of the ink. Therefore, in forming an image on the back side of the recording paper sheet, the image is formed on the shrunk recording paper sheet.

SUMMARY

A technique improved over the aforementioned technique is proposed as one aspect of the present disclosure.

An image forming apparatus according to an aspect of the present disclosure includes an image forming device and a control device. The image forming device performs duplexing by forming a front-side image on a front side of a recording paper sheet and forming a back-side image on a back side of the recording paper sheet. The control device includes a processor and functions, through the processor executing a control program, as a controller and an image processor. The controller allows the image forming device to perform the duplexing based on front-side image data for front side and back-side image data for back side. The image processor creates a reduced-size image by reducing an image represented by the back-side image data from an original size indicated by the back-side image data at a ratio of size reduction predetermined according to a ratio of magnification from a first shrunk state of the recording paper sheet with the front-side image formed but the back-side image not yet formed to a second shrunk state of the recording paper sheet having both the front-side image and the back-side image formed thereon and larger in size than the first shrunk state so that respective sizes of the back-side image and the front-side image on the recording paper sheet are equal to respective original sizes indicated by the front-side image data and the back-side image data. The controller allows the image forming device to form an image represented by the front-side image data on the front side of the recording paper sheet, sets, based on a margin formed by the size reduction of the image represented by the back-side image data, a print start position for the back side of the recording paper sheet at which respective locations of the front-side image and the back-side image on the recording paper sheet are aligned, and then allows the image forming device to form the reduced-size image on the back side of the recording paper sheet.

An image forming apparatus according to another aspect of the present disclosure includes an image forming device and a control device. The image forming device performs duplexing by forming a front-side image on a front side of a recording paper sheet and forming a back-side image on a back side of the recording paper sheet. The control device includes a processor and functions, through the processor executing a control program as a controller, an image processor, and an image corrector. The controller allows the image forming device to perform the duplexing based on front-side image data for front side and back-side image data for back side. The image processor creates a reduced-size image by reducing an image represented by the back-side image data from an original size indicated by the back-side image data at a ratio of size reduction predetermined according to a ratio of magnification from a first shrunk state of the recording paper sheet with the front-side image formed but the back-side image not yet formed to a second shrunk state of the recording paper sheet having both the front-side image and the back-side image formed thereon and larger in size than the first shrunk state so that respective sizes of the back-side image and the front-side image on the recording paper sheet are equal to respective original sizes indicated by the front-side image data and the back-side image data. The image corrector corrects image data representing the reduced-size image for purpose of changing allocation of a margin formed by the size reduction of the image represented by the back-side image data so that the front-side image and the back-side image on the recording paper sheet are aligned in terms of top side, bottom side, right side, and left side. The controller allows the image forming device to form the image represented by the front-side image data on the front side of the recording paper sheet and form the reduced-size image on the back side of the recording paper sheet according the changed allocation of the margin.

DETAILED DESCRIPTION

Figure 1:
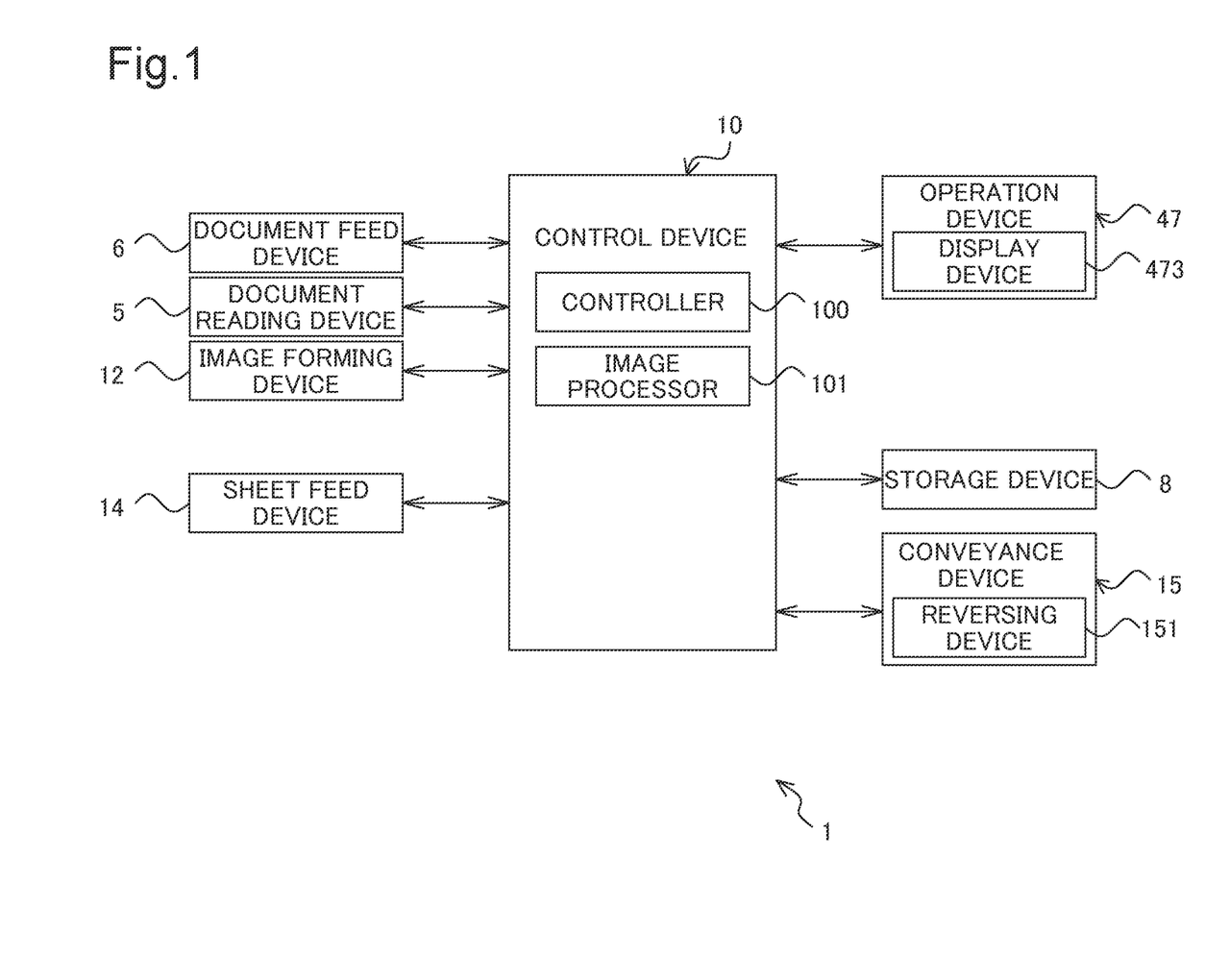
FIG. 1 is a functional block diagram schematically showing an essential internal configuration of an image forming apparatus according to a first embodiment of the present disclosure.

Hereinafter, a description will be given of an image forming apparatus according to embodiments of the present disclosure with reference to the drawings. FIG. 1 is a functional block diagram schematically showing an essential internal configuration of an image forming apparatus 1 according to a first embodiment of the present disclosure. The image forming apparatus 1 is a multifunction peripheral having multiple functions, for example, including a copy function, a print function, a scan function, and a facsimile function.

The image forming apparatus 1 includes a control device 10, a document feed device 6, a document reading device 5, an image forming device 12, a sheet feed device 14, an operation device 47, a storage device 8, and a conveyance device 15.

The document feed device 6 is capable of being opened and closed with respect to the top surface of the document reading device 5 by being mounted by hinges or the like on the top surface of the document reading device 5. The document feed device 6 functions as a document holding cover while the document reading device 5 reads an original document sheet placed on a platen glass. The document feed device 6 is an ADF (auto document feeder). The document feed device 6 includes a document loading tray and feeds original document sheets loaded onto the document loading tray to the document reading device 5 sheet by sheet.

First, a description will be given of the case where a document reading operation is performed on the image forming apparatus 1. The document reading device 5 optically reads an image of an original document sheet fed to the document reading device 5 by the document feed device 6 or an image of an original document sheet placed on the platen glass and generates image data on the original document sheet. The image data generated by the document reading device 5 is saved in an image memory or the like.

Next, a description will be given of the case where an image forming operation is performed on the image forming apparatus 1. Based on image data generated by the document reading operation, image data stored in the image memory or the like, image data received from a computer connected via a network or another image data, the image forming device 12 forms an image on a recording paper sheet fed from the sheet feed device 14.

The image forming device 12 performs printing by forming the image represented by the image data on a recording paper sheet. The image forming device 12 performs printing by forming the image on the recording paper sheet using an ink-jet system. The image forming device 12 includes respective line heads (examples of ink heads) that discharge ink drops of four colors (black, cyan, magenta, and yellow). The line heads discharge ink drops of the individual colors onto a recording paper sheet being conveyed from the sheet feed device 14 via the conveyance device 15 to the image forming device 12, thus forming a multicolor image on the recording paper sheet.

The conveyance device 15 includes a reversing device 151 that reverses the orientation of the recording paper sheet with an image formed thereon by the image forming device 12 so that the trailing end of the recording paper sheet in the direction of conveyance is changed to the leading end.

In a single-sided printing mode, the recording paper sheet with an image formed thereon by the image forming device 12 is conveyed through the conveyance device 15 to an ejection port and then ejected through the ejection port to a sheet output tray.

In a double-sided printing mode, the recording paper sheet with an image formed on its front side by the image forming device 12 is conveyed through the conveyance device 15 to the reversing device 151 and reversed at the reversing device 151. The reversed recording paper sheet is conveyed to the image forming device 12. The recording paper sheet with another image formed on its back side by the image forming device 12 is conveyed through the conveyance device 15 to the ejection port and then ejected through the ejection port to the sheet output tray. Switching from the single-sided printing mode to the double-sided printing mode is performed by a controller 100 (to be described hereinafter) having accepted a user's selection input through the operation device 47.

The operation device 47 accepts user's instructions for various types of operations and processing executable by the image forming apparatus 1, such as an instruction to execute an image forming operation. The operation device 47 includes a display device 473 that displays operation guidance and other types of information for the user. The operation device 47 accepts, through a touch panel provided on the display device 473, input of a user's instruction based on an operation (a touch gesture) of the user on an operation screen displayed on the display device 473.

The display device 473 is formed of a liquid crystal display (LCD) or the like. The display device 473 is provided with the touch panel. When the user makes a touch gesture on a button or key being displayed on the screen, the touch panel accepts an instruction associated with a point where the touch gesture has been made.

The storage device 8 is a large storage device, such as an HDD (hard disk drive) or an SSD (solid state drive), and stores various control programs and others.

The control device 10 includes a processor, a RAM (random access memory), a ROM (read only memory), and a dedicated hardware circuit. The processor is, for example, a CPU (central processing unit), an ASIC (application specific integrated circuit) or an MPU (micro processing unit).

When the processor operates in accordance with a control program stored in the storage device 8, the control device 10 functions as the controller 100 and an image processor 101. However, each of the controller 100 and the other component may not be implemented by the operation of the processor in accordance with the control program but may be constituted by a hardware circuit. Hereinafter, the same applies to the other embodiments unless otherwise stated.

The controller 100 governs the overall operation control of the image forming apparatus 1. The controller 100 is connected to the document feed device 6, the document reading device 5, the image forming device 12, the sheet feed device 14, the operation device 47, the storage device 8, and the conveyance device 15 and controls the operations of these components. The controller 100 executes various types of processing and so on necessary for the image formation of the image forming apparatus 1. For example, in the double-sided printing mode, the controller 100 controls, based on front-side image data for front side and back-side image data for back side, the image forming device 12 and other components to allow these components to form respective images on both the front side and back side of a recording paper sheet.

The image processor 101 subjects an image represented by the back-side image data to size reduction processing according to a ratio of shrinkage of a recording paper sheet occurring due to formation of an image on the front side of the recording paper sheet so that the respective sizes of a back-side image and a front-side image on the recording paper sheet are equal to respective original sizes indicated by the front-side image data and the back-side image data.

For example, the image processor 101 subjects the back-side image data to size reduction processing based on an image reduction ratio table stored in the storage device 8. The image reduction ratio table sets ratios of size reduction applied according to the type of recording paper sheet used and the coverage rate and previously detected by experiments or other methods. The ratio of shrinkage of a recording paper sheet (i.e., the ratio of size reduction to the image represented by the back-side image data) varies depending on the type of recording paper sheet and the coverage rate.

Now, assume that a shrunk state of a recording paper sheet after image formation on the front side thereof and before image formation on the back side thereof (i.e., a recording paper sheet with a front-side image formed but a back-side image not yet formed) in duplexing is referred to as a first shrunk state. Further assume that a state of the recording paper sheet where the shrinkage thereof is completed after duplexing (i.e., the recording paper sheet with both of a front-side image and a back-side image formed thereon) is referred to as a second shrunk state. In terms of the size of the recording paper sheet, the second shrunk state is larger than the first shrunk state. After the printing of the back side, the recording paper sheet expands from the first shrunk state to the second shrunk state. The above-described ratio of size reduction is set so that, as the result of the above expansion of the recording paper sheet, the size of a reduced-size image obtained by size reduction according to the ratio of size reduction becomes equal to the size of an original image represented by the back-side image data.

Figure 2A:
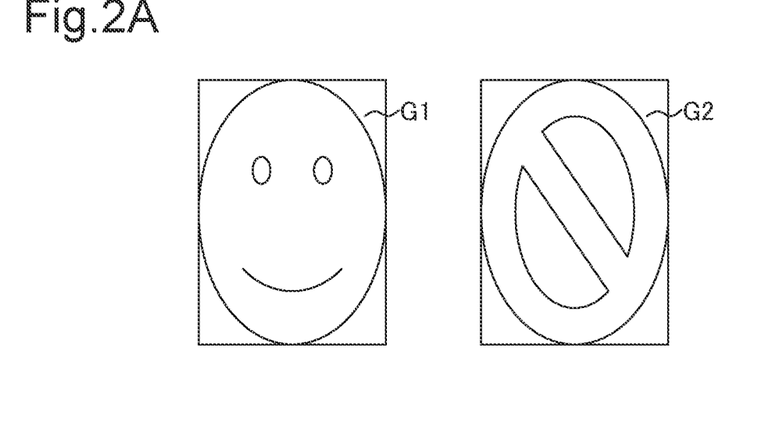
FIG. 2A is a view showing examples of respective document images formed on the front and back sides of a recording paper sheet.

FIG. 2A is a view showing examples of respective document images formed on the front and back sides of a recording paper sheet P. Hereinafter, a description will be given of the case where, as shown in FIG. 2A, a document image G1 containing a "smiley face" is printed on the front side of a recording paper sheet P and a document image G2 containing a "nix sign" is printed on the back side of the recording paper sheet P.

Figure 2B:
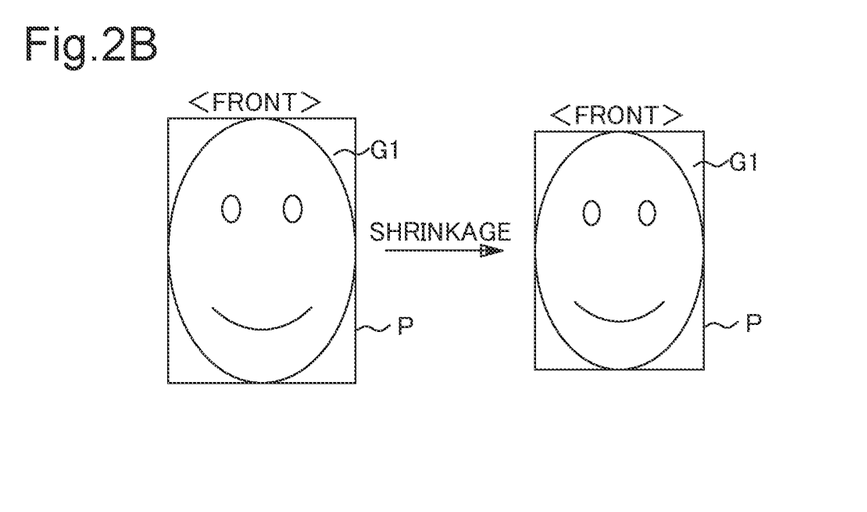
FIG. 2B is a view for illustrating shrinkage of the recording paper sheet.

FIG. 2B is a view for illustrating shrinkage of the recording paper sheet P. As shown in FIG. 2B, the recording paper sheet P with a document image G1 formed on the front side shrinks, as exaggeratingly shown in FIG. 2B, in the process of hardening or drying of ink applied to the front side of the recording paper sheet P; the same applies hereinafter.

Figure 2C:
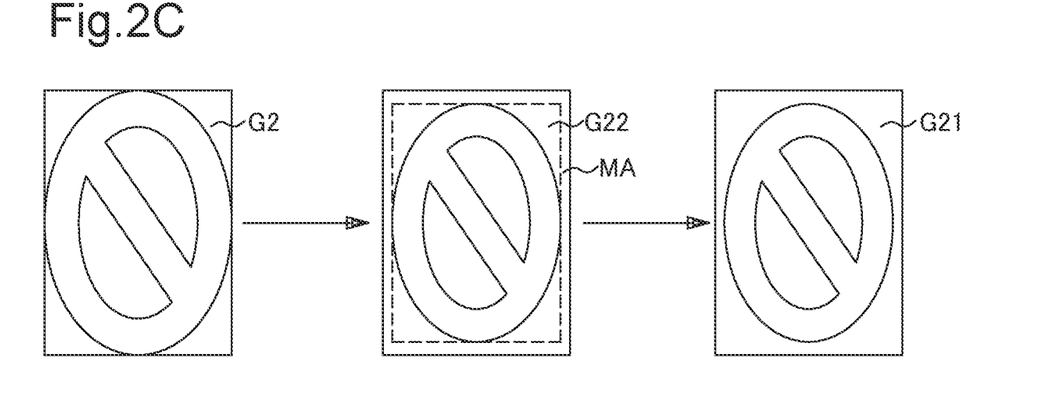
FIG. 2C is a view for illustrating size reduction of the document image for the back side.

FIG. 2C is a view for illustrating size reduction of the document image for back side. As shown in FIG. 2C, the image processor 101 creates a reduced-size image G21 reduced in size from the document image G2 according to the ratio of shrinkage of the recording paper sheet P. Specifically, the image processor 101 reduces the whole size of the document image G2 to obtain a reduced-size document image G22 and then adds a margin MA to the reduced-size document image G22 to form a reduced-size image G21 so that the whole size of the reduced-size image G21 is equal to the original whole size of the document image G2. Thus, an image representing a "nix sign" is reduced in size.

The controller 100 sets a print start position for the back side of the recording paper sheet P based on the margin MA formed by the above size reduction, for the purpose of aligning the front-side image with the back-side image in terms of their top side, bottom side, right side, and left side.

Figure 3A:
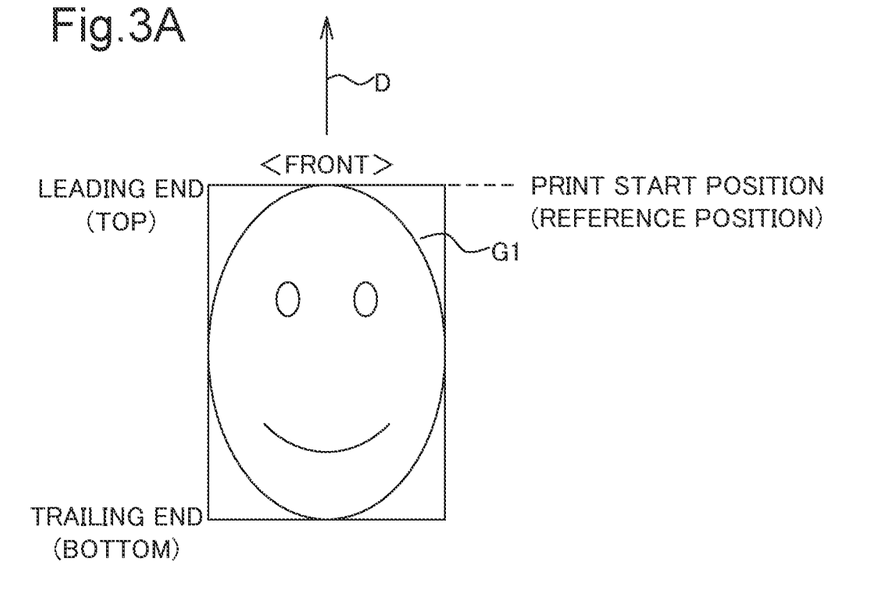
FIG. 3A is a view showing a print start position for the front side (a reference position) of the recording paper sheet.
Figure 3B:
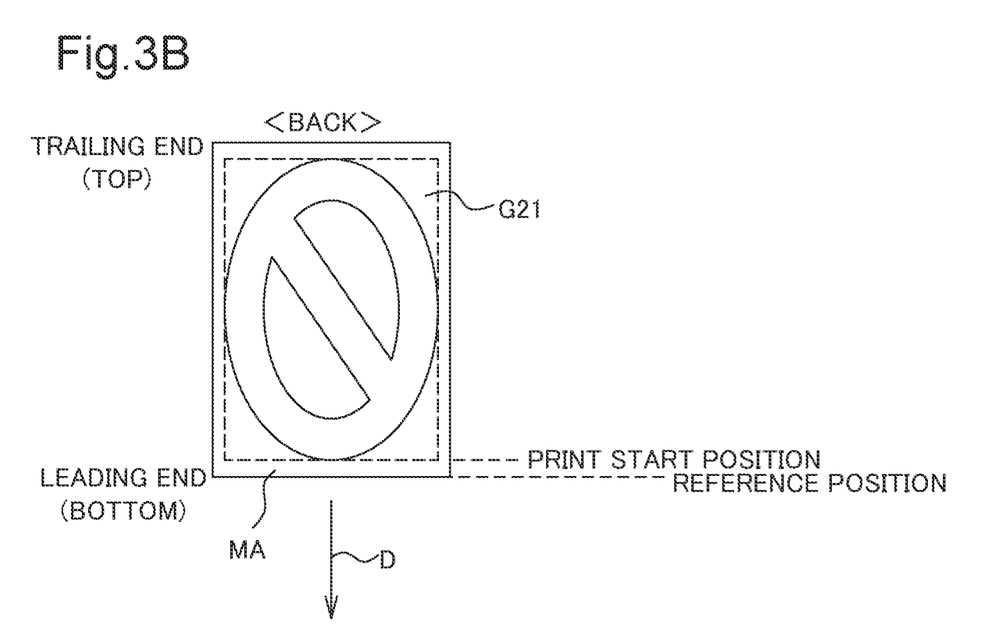
FIG. 3B is a view showing a print start position for the back side of the recording paper sheet.

First, a description will be given of the setting of a print start position in the direction of conveyance (the top-to-bottom direction) of the recording paper sheet P. FIG. 3A is a view showing a print start position for the front side (a reference position) of the recording paper sheet P. FIG. 3B is a view showing a print start position for the back side of the recording paper sheet P. Assume that the reduced-size image G21 shown in FIG. 2C is located at the center of the recording paper sheet P. In this case, in order to align, on the recording paper sheet P, the center of the reduced-size image G21 in the direction of conveyance with the center of the document image G2 in the direction of conveyance, the controller 100 moves, as shown in FIG. 3B, the print start position for the back side of the recording paper sheet P toward the trailing end of the recording paper sheet P by a half of the total length of the margin MA in the direction D of conveyance (by the dimension of a portion of the margin MA located on the leading end side regardless of a portion of the margin MA located on the trailing end side) with respect to the print start position for the front side (the reference position).

Next, a description will be given of the adjustment of a print start position in the widthwise direction of the recording paper sheet P (the direction orthogonal to the direction of conveyance, i.e., the right-to-left direction). When the center of the reduced-size image G21 in the direction of conveyance is aligned with the center of the document image G2 in the direction of conveyance and the left end of the recording paper sheet P as one end thereof (or the right end as the other end) is the print start position, the controller 100 moves the print start position for the back side of the recording paper sheet P toward the right (the left when the print start position is the right end of the recording paper sheet P as the other end thereof) by a half of the total length of the margin MA in the widthwise direction with respect to the print start position for the front side (the reference position). When the center of the recording paper sheet P in the right-to-left direction is the print start position, the controller 100 does not adjust the print start position in terms of the widthwise direction.

Figure 4:
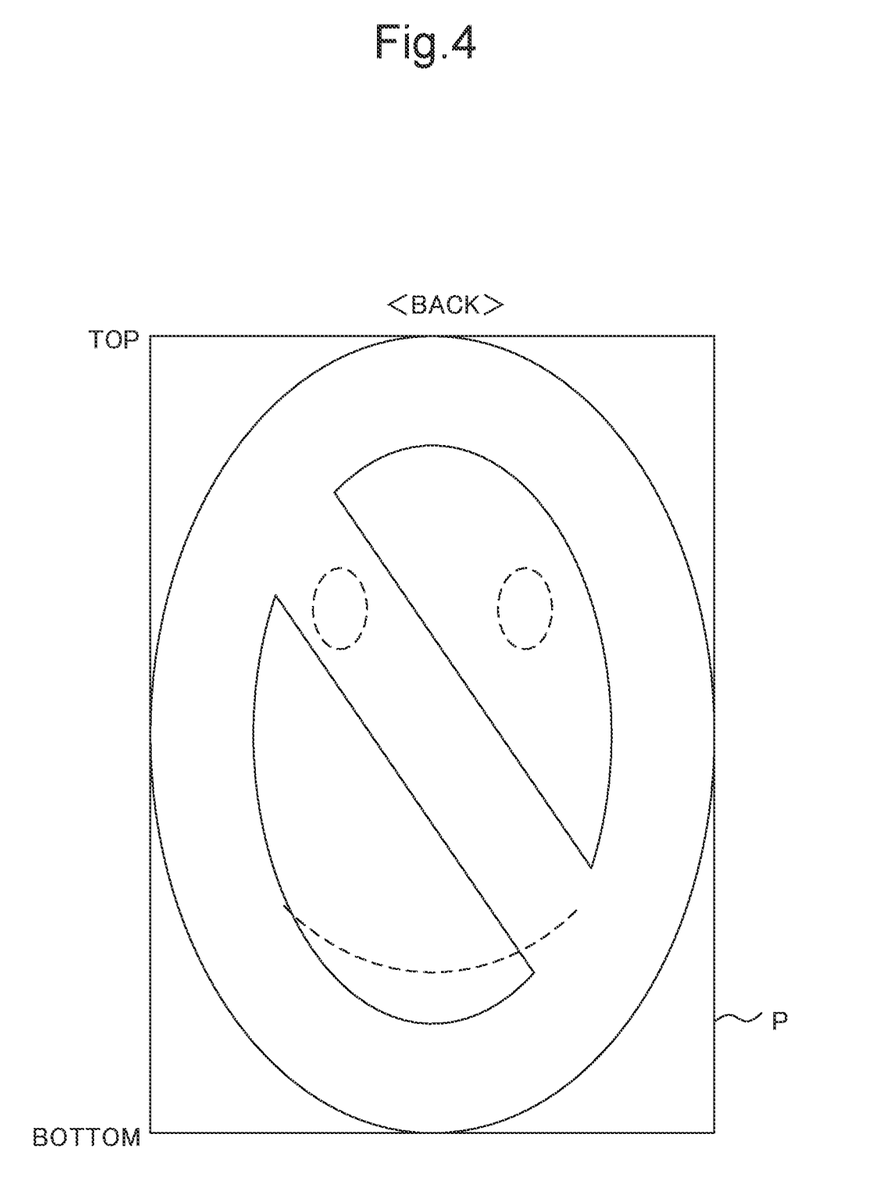
FIG. 4 is a view showing a printing result obtained by adjusting the print start position for the back side of the recording paper sheet.

FIG. 4 is a view showing a printing result obtained by adjusting the print start position for the back side of the recording paper sheet P.

Figure 5:
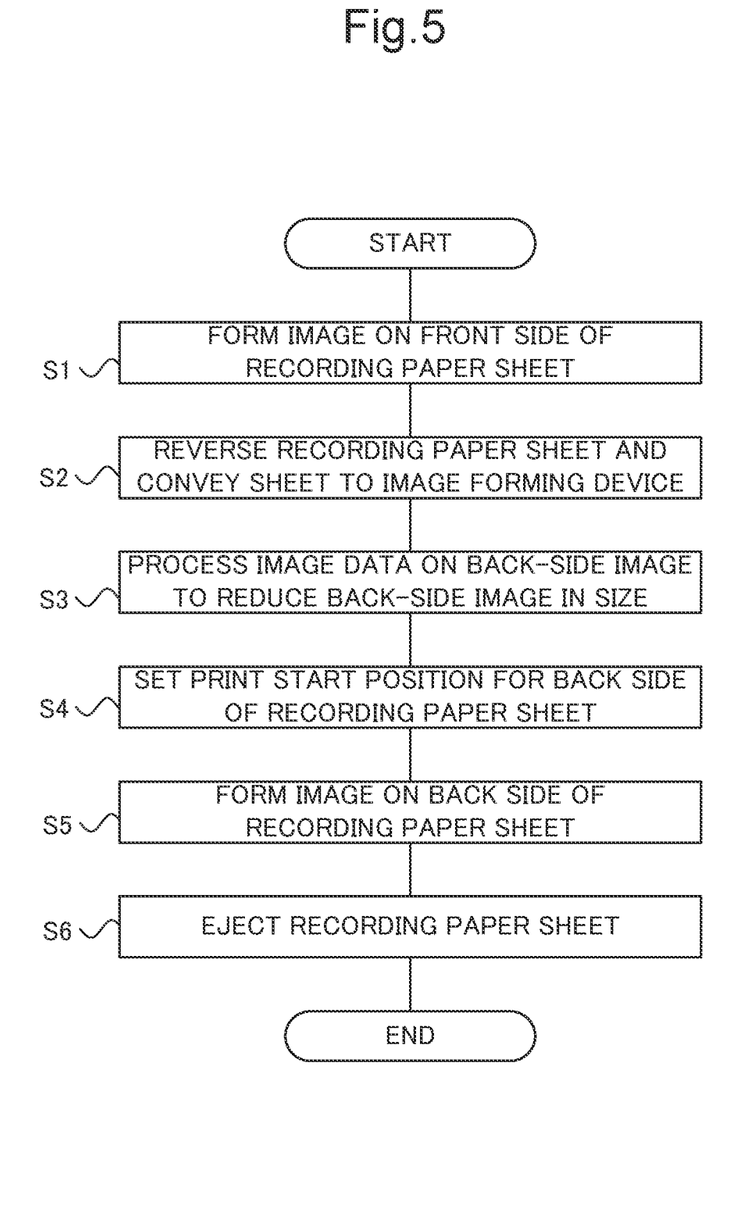
FIG. 5 is a flowchart showing an example of position adjustment processing.

Next, a description will be given of an example of position adjustment processing performed by the control device 10 of the image forming apparatus 1 with reference to the flowchart shown in FIG. 5. This position adjustment processing is processing performed in duplexing.

The controller 100 controls the image forming device 12, the conveyance device 15, and other components based on front-side image data for front side to allow these components to form a document image G1 on the front side of a recording paper sheet P (step S1). After step S1, the controller 100 controls the conveyance device 15 to allow the conveyance device 15 to reverse the recording paper sheet P and convey the reversed recording paper sheet P to the image forming device 12 (step S2). The image processor 101 subjects back-side image data for back side to size reduction processing based on the image reduction ratio table stored in the storage device 8 to reduce a document image G2 in size as described above and creates a reduced-size image G21 in which a margin MA is added to the document image G22 reduced in size (step S3).

The controller 100 sets the print start position for the back side of the recording paper sheet P in the manner as described above, based on the margin MA formed by reducing the document image G2 in size, so that the document image G1 is aligned with the reduced-size image G21 in terms of their top side, bottom side, right side, and left side (step S4). The controller 100 controls, based on image data representing the reduced-size image G21, the image forming device 12, the conveyance device 15, and other components to allow these components to form the reduced-size image G21 on the back side of the recording paper sheet P (step S5). The controller 100 controls the conveyance device 15 to allow it to eject the recording paper sheet P to the sheet output tray (step S6). After step S6, the controller 100 ends the position adjustment processing.

In relation to the general image forming apparatus described previously, there is known a general technique of reducing a back-side image in size according to the ratio of shrinkage of a recording paper sheet occurring due to formation of a front-side image on the recording paper sheet, thus equalizing the size of the front-side image with the size of the back-side image. However, in this general technique, the front-side image can be equalized in size with the back-side image, but the front-side image and the back-side image will be misaligned.

Figure 10A:
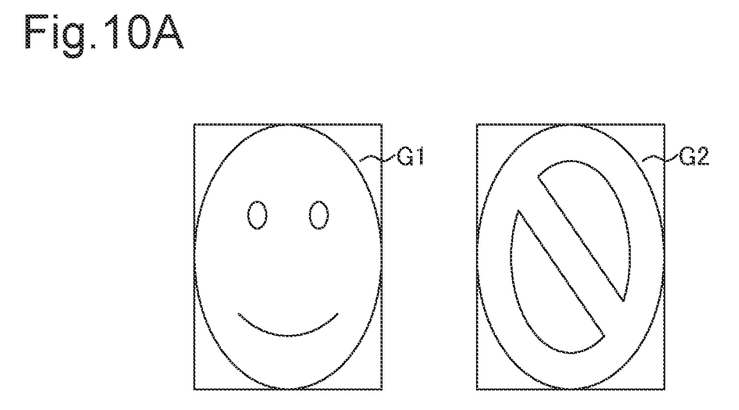
FIGS. 10A to 10D are views for illustrating a conventional problem in duplexing.

As an example, a description will be given below of the case where, as shown in FIG. 10A, a document image G1 containing a "smiley face" is printed on the front side of a recording paper sheet P and a document image G2 containing a "nix sign" is printed on the back side of the recording paper sheet P.

Figure 10B:
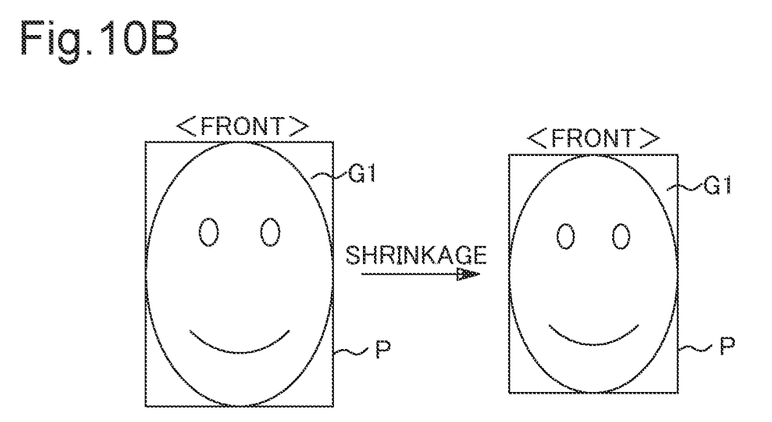

As shown in FIG. 10B, the recording paper sheet P with a document image G1 formed on the front side shrinks, as exaggeratingly shown in FIG. 10B, in the process of hardening or drying of ink applied to the front side of the recording paper sheet P.

Figure 10C:
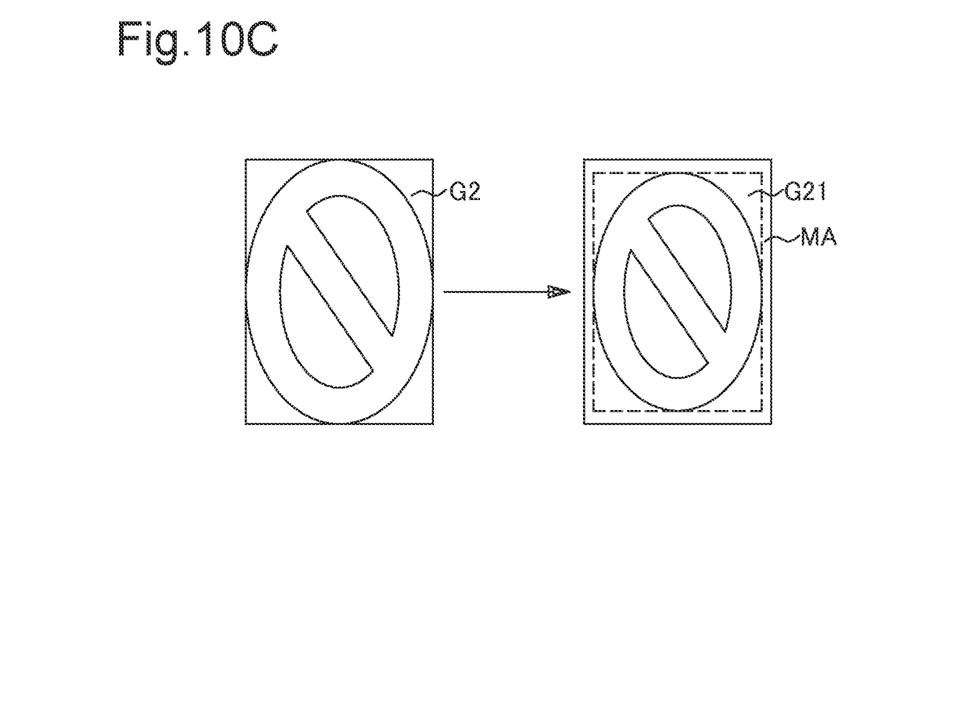

As shown in FIG. 10C, in a reduced-size image G21 reduced in size from the document image G2 according to the ratio of shrinkage of the recording paper sheet P, a margin MA is formed by the size reduction. Therefore, if the reduced-size image G21 is formed on the back side of the recording paper sheet P as it is, an image representing a "nix sign" on the back side will be misaligned with an image representing a "smiley face" on the front side. In addition, the recording paper sheet P will further shrink in the process of hardening or drying of ink applied to the back side of the recording paper sheet P.

In order to eliminate the above-described misalignment, it is conceivable to change the hardware configuration of the image forming device that forms an image on a recording paper sheet P. However, if this approach is adopted, the apparatus will be complicated and the cost will rise.

Unlike the above general technique, in the first embodiment, the print start position for the back side of a recording paper sheet is set, based on a margin MA formed by reducing the size of the document image G2 represented by back-side image data for back side, so that the document image G1 is aligned with the reduced-size image G21 in terms of their top side, bottom side, right side, and left side. As a result, it can be avoided that the images on both sides of the recording paper sheet in duplexing are misaligned due to the margin MA added upon size reduction of the document image G2. Therefore, misalignment between the images on both sides of the recording paper sheet in duplexing can be eliminated, without changing the hardware configuration of the image forming device 12, with a relatively simple structure.

Figure 6:
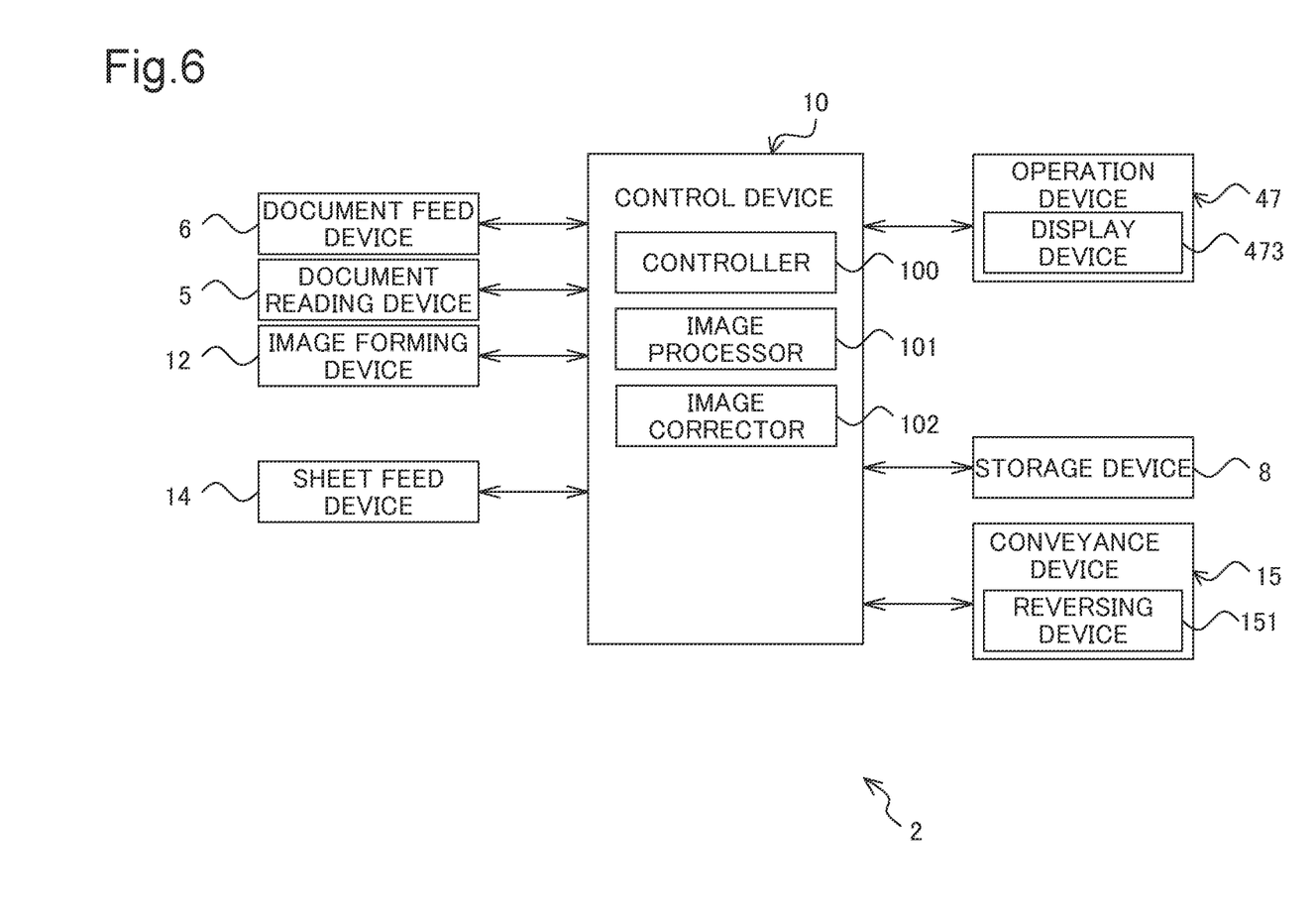
FIG. 6 is a functional block diagram schematically showing an essential internal configuration of an image forming apparatus according to a second embodiment of the present disclosure.

FIG. 6 is a functional block diagram schematically showing an essential internal configuration of an image forming apparatus 2 according to a second embodiment of the present disclosure. The image forming apparatus 2 according to the second embodiment is different from the image forming apparatus 1 according to the first embodiment in that the control device 10 includes an image corrector 102. When the above-described processor operates in accordance with a control program stored in the storage device 8, the control device 10 functions not only as the controller 100 and an image processor 101, but also as the image corrector 102.

The image corrector 102 corrects image data representing the reduced-size image G21 for the purpose of allocating a margin MA formed by size reduction of the document image G2 represented by back-side image data for back side so that the document image G1 and the reduced-size image G21 are aligned in terms of their top side, bottom side, right side, and left side.

Figure 7:
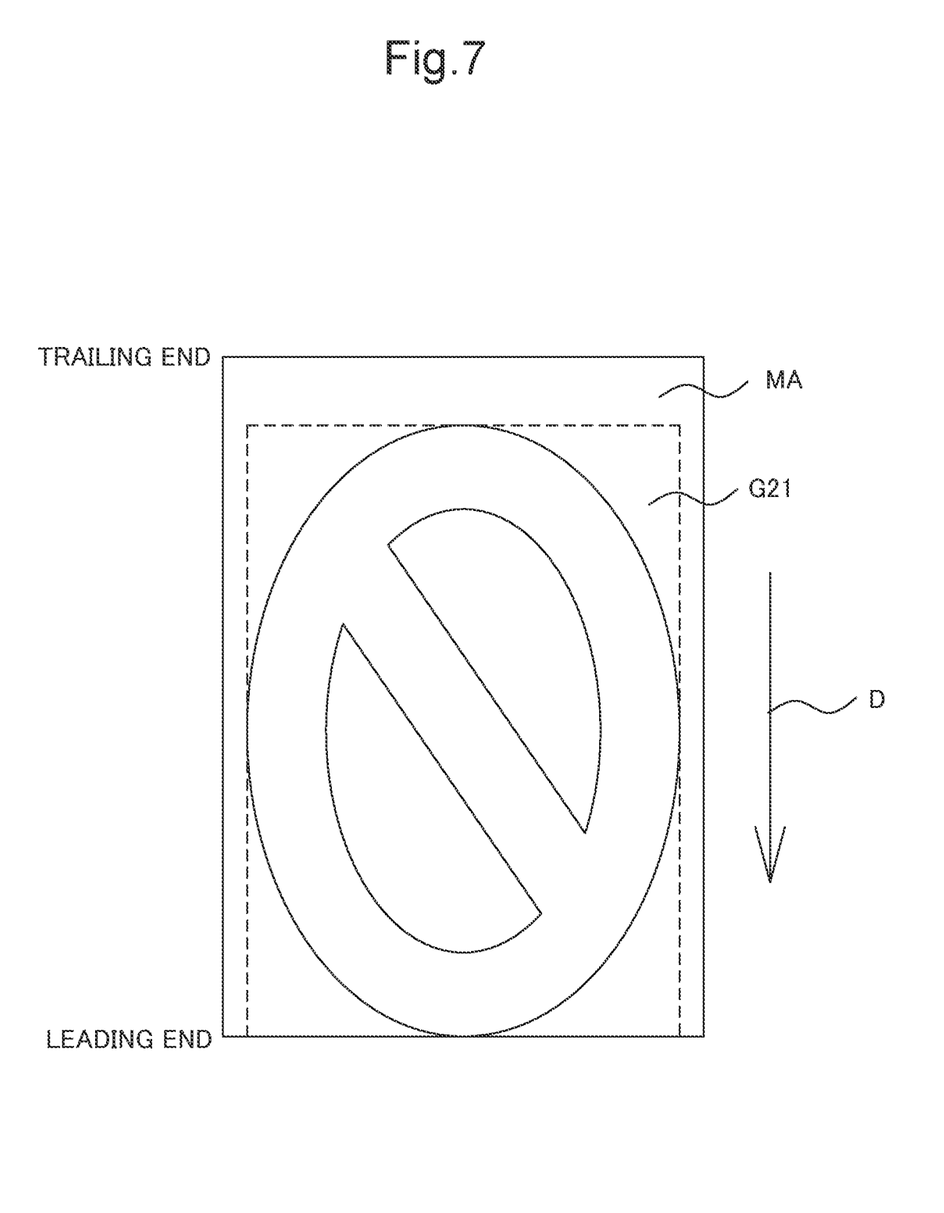
FIG. 7 is a view for illustrating allocation of a margin MA.

FIG. 7 is a view for illustrating allocation of a margin MA. First, a description will be given of allocation of the margin MA in the direction of conveyance (the top-to-bottom direction) of the recording paper sheet P. In order to align the document image G1 and the reduced-size image G21 in terms of their top and bottom sides, as shown in FIG. 7, the image corrector 102 does not allocate the margin MA to be added by size reduction of the document image G2 represented by the back-side image data to the leading end side of the recording paper sheet P in the direction D of conveyance, but allocates it only to the trailing end side of the recording paper sheet P in the direction D of conveyance. As a result, the whole size of the reduced-size image G21 in the direction D of conveyance is equalized with the original whole size of the document image G2 in the direction D of conveyance. Thus, there is no need for the controller 100 to set the print start position in the direction D of conveyance based on the margin MA as described in the first embodiment.

Subsequently, a description will be given of allocation of the margin MA in the widthwise direction (the right-to-left direction) of the recording paper sheet P. When the left end (or right end) of the recording paper sheet P is a predetermined print start position, the image corrector 102 allocates the margin MA in the widthwise direction only to the right end side (or the left end side). As a result, the whole size of the reduced-size image G21 in the widthwise direction is equalized with the original whole size of the document image G2 in the widthwise direction. When the center of the recording paper sheet P in the right-to-left direction is the print start position, the image corrector 102 allocates the margin MA in the widthwise direction evenly between the right end side and the left end side.

Since, in this manner, the whole size of the reduced-size image G21 on the recording paper sheet P after duplexing is equalized with the original whole size of the document image G2, there is no need for the controller 100 to set the print start position in the widthwise direction based on the margin MA as described in the first embodiment.

In the second embodiment, it can be avoided that the images on both sides of the recording paper sheet in duplexing are misaligned due to the margin MA added upon size reduction of the document image G2 represented by back-side image data for back side. Therefore, misalignment between the images on both sides of the recording paper sheet in duplexing can be eliminated, without changing the hardware configuration of the image forming device 12, with a relatively simple structure.

Figure 10D:
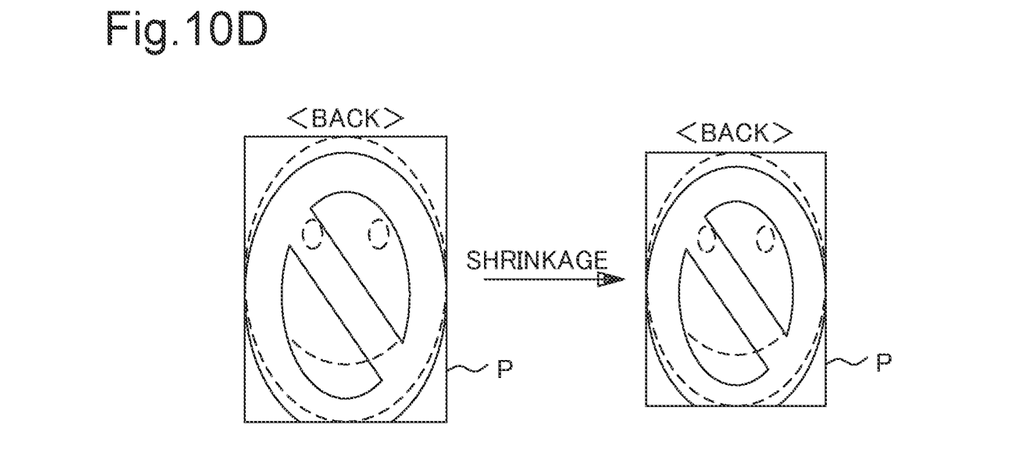

After the recording paper sheet P is subjected to duplexing, as shown in FIG. 10D, the recording paper sheet P further shrinks in the process of hardening or drying of ink applied to the back side of the recording paper sheet P. Thereafter, when time passes, the recording paper sheet P expands to get close to substantially the original size. However, the recording paper sheet P does not exactly return to the original size.

Therefore, the image formed on the recording paper sheet P is somewhat smaller than the original size of the document image. For example, when a shrunk recording paper sheet P finally expands to 99% of the original size, a 100 mm×100 mm square in the original size of the document image finally becomes a 99 mm×99 mm square.

In view of the above, in an image forming apparatus according to a third embodiment of the present disclosure, the image processor 101 executes, according to expansion and shrinkage of a recording paper sheet P, magnification processing for magnifying a document image represented by front-side image data for front side and size reduction processing for reducing the size of a document image represented by back-side image data for back side so that the respective sizes of a front-side image and a back-side image on the recording paper sheet are equal to the respective original sizes of the document image for front side and the document image for back side.

Specifically, the image processor 101 creates a magnified image obtained by magnifying a document image represented by front-side image data for front side from its original size at a ratio of magnification predetermined according to a second shrunk state of a recording paper sheet after duplexing (i.e., a recording paper sheet with a front-side image and a back-side image formed thereon) so that the respective sizes of the back-side image and the front-side image on the recording paper sheet are equal to respective original sizes indicated by the front-side image data and the back-side image data. Furthermore, the image processor 101 creates a reduced-size image obtained by reducing a document image represented by back-side image data for back side from its original size at a ratio of size reduction predetermined according to a ratio of magnification from a first shrunk state of the recording paper sheet occurring after the formation of an image on the front side (i.e., the recording paper sheet with the front-side image formed but the back-side image not yet formed) and smaller than the second shrunk state to the second shrunk state.

For example, when it is expected that a recording paper sheet P once shrinks to 98% of its original size as a result of the formation of a front-side image and the shrunk recording paper sheet P finally expands to 99% of its original size, the image processor 101 magnifies a document image represented by front-side image data for front side at a ratio of magnification of "100/99" and reduces a document image represented by back-side image data for back side at a ratio of size reduction of "98/99".

The controller 100 allows the image forming device 12 to form on the front side of the recording paper sheet a magnified image obtained by magnification at the above ratio of magnification from the original size and form on the back side of the recording paper sheet a reduced-size image obtained by size reduction at the above ratio of size reduction from the original size.

Figure 8A:
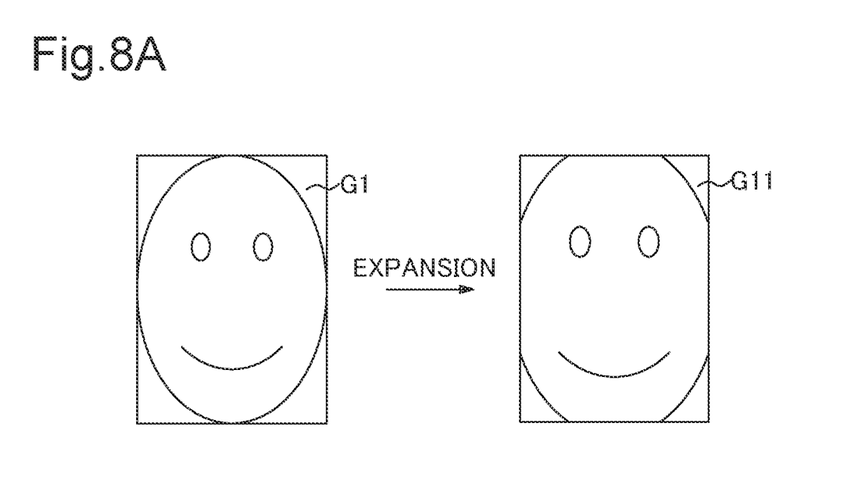
FIG. 8A is a view for illustrating magnification of a document image represented by front-side image data.
Figure 8B:
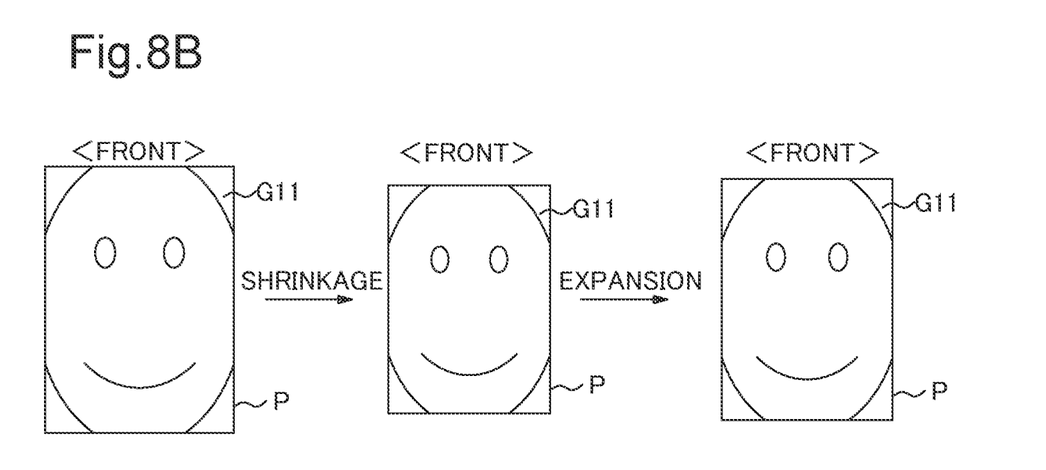
FIG. 8B is a view for illustrating expansion and shrinkage of a recording paper sheet P.

FIG. 8A is a view for illustrating magnification of a document image represented by front-side image data for front side. FIG. 8B is a view for illustrating expansion and shrinkage of a recording paper sheet P. As shown in FIG. 8A, the image processor 101 creates a magnified image G11 magnified from the document image G1 according to expansion and shrinkage of the recording paper sheet P.

As shown in FIG. 8B, the recording paper sheet P with the magnified image G11 formed thereon shrinks in the process of hardening or drying of ink applied to the front side of the recording paper sheet P. When an image is formed on the back side, the recording paper sheet P further shrinks, but finally expands. As a result, the magnified image G11 formed on the recording paper sheet P has the same size as the document image G1.

The image corrector 102 subjects image data on the document image G1 to magnification correction at the above ratio of magnification based on an image magnification ratio table stored in the storage device 8. Furthermore, the image corrector 102 subjects image data on the document image G2 to size reduction correction at the above ratio of size reduction based on an image reduction ratio table stored in the storage device 8. The image magnification ratio table sets ratios of magnification according to the type of recording paper sheet used and the coverage rate.

The ratio of expansion and shrinkage of a recording paper sheet (i.e., the ratio of magnification of a document image for front side) varies depending on the type of recording paper sheet, the coverage rate, and so on. Ratios of magnification at each of which the respective sizes of back-side and front-side images on a recording paper sheet are equal to respective original sizes indicated by front-side image data for front side and back-side image data for back side are previously detected according to the type of recording paper sheet and the coverage rate by experiments or other methods. The image reduction ratio table stores respective ratios of magnification associated with respective combinations of types of recording paper sheet and coverage rates.

The controller 100 allows the image forming device 12 to form the magnified image G11 magnified from the original size on the front side of a recording paper sheet P. The controller 100 sets, based on a margin MA formed by reducing the size of the document image G2, a print start position for the back side of the recording paper sheet P at which the locations of the front-side image and the back-side image on the recording paper sheet are aligned with each other, and then allows the image forming device 12 to form a reduced-size image G21 reduced from the original size on the back side of the recording paper sheet P. Alternatively, the controller 100 may allow the image forming device 12 to form on the back side of the recording paper sheet P, instead of the above reduced-size image G21, the reduced-size image changed in terms of allocation of the margin MA in the second embodiment.

According to the third embodiment, misalignment between the images on both sides of a recording paper sheet in duplexing can be eliminated more accurately than in the first embodiment.

Recording paper sheets P are processed products and therefore subtly different in size from sheet to sheet. For this reason, a size difference of one recording paper sheet P from others may cause misalignment from the others, even if a document image represented by back-side image data for back side to be formed on the back side of the recording paper sheet P is reduced in size according to the degree of shrinkage of the recording paper sheet P occurring at the formation of a front-side image on the recording paper sheet P and processing for the margin MA is executed as described in the first or second embodiment.

Figure 9:
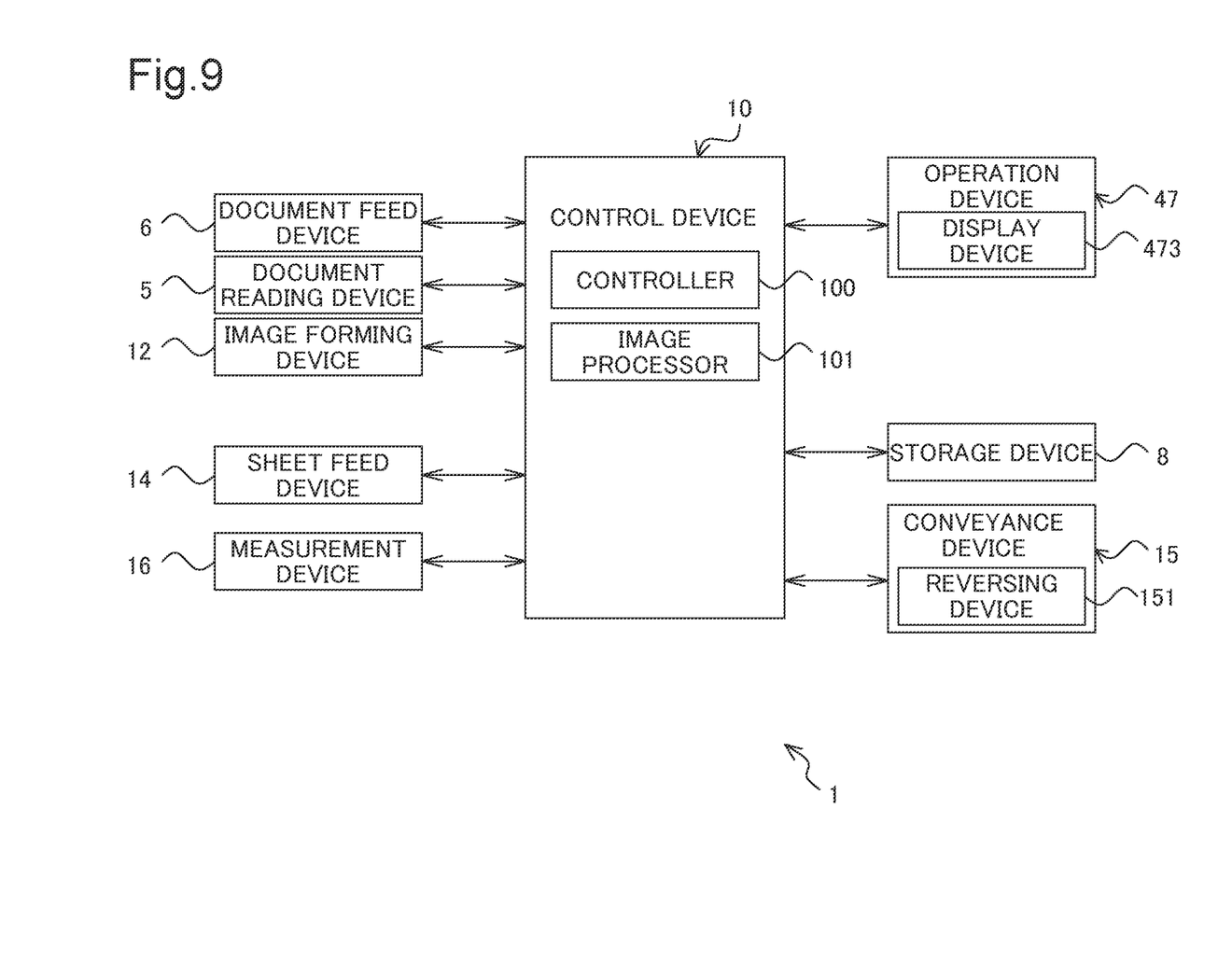
FIG. 9 is a functional block diagram schematically showing an essential internal configuration of an image forming apparatus according to a fourth embodiment of the present disclosure.

To cope with the above problem, as shown in FIG. 9, in a fourth embodiment of the present disclosure, the image forming apparatus 1 further includes a measurement device 16 that measures a recording paper sheet P prior to the formation of a front-side image thereon (i.e., a recording paper sheet P with neither front-side image nor back-side image yet formed thereon) in terms of the length L1 in the direction D of conveyance. The controller 100 compares the actual length L1 measured by the measurement device 16 with a length L2 of standard size of recording paper sheet in the direction of conveyance, the length L2 being previously stored based on the standard size of the measured recording paper sheet P. When the former is longer (L1>L2), the controller 100 moves the print start position for the back side of the recording paper sheet P toward the trailing end side of the recording paper sheet P in the direction D of conveyance by a half of the difference (L1−L2) between both the lengths. When the former is shorter (L1<L2), the controller 100 moves the print start position for the back side of the recording paper sheet P toward the leading end side of the recording paper sheet P in the direction D of conveyance by a half of the difference (L2−L1) between both the lengths.

The measurement device 16 is provided, for example, near a nip formed between a pair of registration rollers constituting part of the conveyance device 15. The measurement device 16 includes, for example, an optical sensor and a processing circuit. The optical sensor detects the leading end and trailing end of a recording paper sheet P passing through the pair of registration rollers. The processing circuit counts, at a stage prior to the formation of a front-side image, the number of drive pulses of a drive motor rotating the pair of registration rollers from the detection of the leading end of the recording paper sheet P to the detection of the trailing end thereof by the optical sensor. The processing circuit previously stores respective lengths of recording paper sheets P in the direction D of conveyance corresponding to respective count values of drive pulses and calculates, from the count value obtained by the counting, the length L1 of the recording paper sheet P in the direction D of conveyance prior to the formation of a front-side image. The measurement device 16 outputs the calculated length L1 to the controller 100.

For example, assume that when a front-side image is formed but a back-side image is not yet formed, a recording paper sheet P of A4 size (297 mm×210 mm) which is a standard size shrinks at a ratio of shrinkage of 98%. In this case, the ratio of size reduction to back-side image data for back side stored in the image reduction ratio table is 98%. Further assume that the length L2 of A4 size in the direction D of conveyance is 297 mm.

When the actual length L1 of the recording paper sheet P obtained by the measurement device 16 is 289.86 mm, the controller 100 compares 289.86 mm, which is the actual length L1 with 297 mm, which is the length L2 of standard size of recording paper sheet in the direction D of conveyance. When the former is longer (L1>L2), the controller 100 moves the print start position for the back side of the recording paper sheet P toward the trailing end side of the recording paper sheet P in the direction D of conveyance by a half of the difference between both the lengths. When the former is shorter (L1<L2), the controller 100 moves the print start position for the back side of the recording paper sheet P toward the leading end side of the recording paper sheet P in the direction D of conveyance by a half of the difference between both the lengths. Specifically, since the actual length L1 obtained by the measurement device 16 is 289.86 mm and the length L2 of standard size of recording paper sheet in the direction D of conveyance is 297 mm, the controller 100 moves the print start position for the back side of the recording paper sheet P toward the leading end (forward end) side of the recording paper sheet P in the direction D of conveyance by 3.57 mm which is a half of the difference (7.14 mm) between both the lengths. On the other hand, when the actual length L1 obtained by the measurement device 16 is 298.2 mm, the controller 100 moves the print start position for the back side of the recording paper sheet P toward the trailing end side of the recording paper sheet P in the direction D of conveyance by 0.6 mm which is a half of the difference (1.2 mm) between both the lengths. Thus, misalignment occurring due to a size difference between recording paper sheets P can be eliminated.

The present disclosure is not limited to the above embodiments and can be modified in various ways. For example, although the above embodiments describe the case where images are formed on a recording paper sheet P using an ink-jet system, the present disclosure is applicable to the case where images are electrophotographically formed on a recording paper sheet P using a developer containing toner.

The structures, configurations, and processing of the above embodiments described with reference to FIGS. 1 to 9 are merely illustrative of the present disclosure and are not intended to limit the present disclosure to them.

While the present disclosure has been described in detail with reference to the embodiments thereof, it would be apparent to those skilled in the art the various changes and modifications may be made therein within the scope defined by the appended claims.

What is claimed is:

1. An image forming apparatus comprising:
   an image forming device that performs duplexing by forming a front-side image on a front side of a recording paper sheet and forming a back-side image on a back side of the recording paper sheet; and
   a control device that includes a processor and functions, through the processor executing a control program, as
   (i) a controller that allows the image forming device to perform the duplexing based on front-side image data for front side and back-side image data for back side,
   (ii) an image processor that creates a reduced-size image obtained by reducing an image represented by the back-side image data from an original size represented by the back-side image data at a ratio of size reduction predetermined according to a ratio of magnification from a first shrunk state of the recording paper sheet with the front-side image formed but the back-side image not yet formed to a second shrunk state of the recording paper sheet having both the front-side image and the back-side image formed thereon and larger in size than the first shrunk state so that respective sizes of the back-side image and the front-side image on the recording paper sheet are equal to respective original sizes indicated by the front-side image data and the back-side image data, and
   (iii) an image corrector that performs a correction, on image data representing the reduced-size image, to allocate a margin formed by the size reduction of the image represented by the back-side image data to a trailing end side of the recording paper sheet in a direction of conveyance of the recording paper sheet without allocating the margin to a leading end side of the recording paper sheet in the direction of conveyance,
   wherein the controller allows the image forming device to form an image represented by the front-side image data on the front side of the recording paper sheet and allows the image forming device to form the reduced-size image on the back side of the recording paper sheet according to the allocation of the margin.

2. The image forming apparatus according to claim 1, wherein the image corrector further performs a correction, on the image data representing the reduced-size image, to allocate, when a left end of the recording paper sheet is a predetermined print start position, the margin in the widthwise direction to a right end side of the recording paper sheet without allocating the margin to a left end side of the recording paper sheet, and to allocate, when a right end of the recording paper sheet is a predetermined print start position, the margin in the widthwise direction to the left end side of the recording paper sheet without allocating the margin to a right end side of the recording paper sheet.

* * * * *